United States Patent [19]

Casady et al.

[11] Patent Number: 4,759,009
[45] Date of Patent: Jul. 19, 1988

[54] REMOTE DIGITAL CARRIER ALARM AND TERMINAL BY-PASS SYSTEM

[75] Inventors: Donald R. Casady; Cecil L. Suter, both of Tulsa, Okla.

[73] Assignee: Seiscor Technologies, Inc., Tulsa, Okla.

[21] Appl. No.: 752,743

[22] Filed: Jul. 8, 1985

[51] Int. Cl.⁴ .............................. H04J 1/10; H04J 3/00
[52] U.S. Cl. ....................................... 370/55; 370/15; 370/86
[58] Field of Search ...................... 370/86, 111, 85, 84, 370/15, 16, 55, 110.1, 13, 17

[56] References Cited

U.S. PATENT DOCUMENTS

| | | | |
|---|---|---|---|
| 4,046,964 | 9/1977 | Daugherty et al. | 370/55 |
| 4,320,508 | 3/1982 | Takezoe | 370/15 |
| 4,393,492 | 7/1983 | Bishop | 370/15 |
| 4,435,704 | 3/1984 | Hashimoto | 370/15 |

FOREIGN PATENT DOCUMENTS

0137154  7/1985  Japan ...................................... 370/15

Primary Examiner—Douglas W. Olms
Assistant Examiner—Curtis Kuntz
Attorney, Agent, or Firm—Richard M. Sharkansky

[57] ABSTRACT

A T1 digital carrier system having a master terminal and four serially coupled remote terminals. Each remote terminal has a by-pass switch for automatically by-passing that remote terminal should a service threatening condition exist therein, thereby maintaining service to all remaining remote terminals. In addition, major and minor alarm information (indicating service requiring conditions) is transmitted by each remote terminal during signaling frames in the T1 serial bit stream.

17 Claims, 8 Drawing Sheets

REMOTE DIGITAL CARRIER ALARM AND TERMINAL BY-PASS SYSTEM

BACKGROUND OF THE INVENTION

This invention relates generally to communication systems and, more particularly, to communication systems wherein information is transmitted from a main terminal serially through a plurality of remote terminals and then back to the main terminal and still more particularly to systems of such type wherein the information is time multiplexed.

Digital communication systems of the prior art are typically of the type having two terminals which communicate with each other. Each terminal includes a plurality of processing units and is adapted to transmit and receive information over a plurality of channels, each channel being associated with a corresponding processing unit. Examples of a processing unit are voice channel unit or data channel unit, referred to as a voice/data unit. In one such system, all channels transmitted by one terminal are received by the other terminal. In North America, one type of such digital carrier system is called a T1 digital carrier system having 24 channels, each associated with a corresponding one of 24 time slots. A T1 system is discussed in U.S. Pat. No. 4,059,731, issued Nov. 22, 1977 to Green et al and in U.S. Pat. No. 4,245,340 issued Jan. 13, 1981 to Landry. Other types of T1 digital carrier systems exist, such as a European 32 channel system, but in any event, both the North American and European systems operate on the principle that the plurality of channels are transmitted digitally using a serial bit stream made up of a corresponding plurality of time slots, one time slot for each channel. Thus, the data stream may be considered as being made up of a sequence of 24 time slots. It follows then that if less than 24 channels are required, the processing units associated with those unused channels remain idle. In order to improve the processing unit usage efficiency, a system was developed wherein a main terminal, in a central office, is serially coupled to a plurality of remote terminals, each one of the remote terminals having a plurality of channels with a plurality of corresponding processing units associated therewith. Thus, for example, with 4 remote terminals, each one of such terminals would include 6 processing units. Therefore, instead of having two locations, each with 24 processing units, the 24 units previously housed at one of the locations would be distributed for example, to 4 remote locations, each location having 6 processing units with the central office maintaining 24 processing units. With such arrangement, one 24 channel system at the central office can service several remote locations, each location requiring less than all 24 channels. With each remote terminal being a separate, independent terminal, determining the operational "health", that is, operational condition of each terminal, is paramount and such information should be ascertainable at the central office. Further, should any of these remote terminals fail in such a way as to threaten operation of the entire digital carrier communication system, a fail-safe protection scheme is required to ensure that the failed remote terminal does not disrupt the entire system. One such technique used to provide uninterrupted operation of the system includes apparatus for detecting a condition at a remote terminal which would normally disrupt the entire system. The apparatus then isolates the effected remote terminal. However, in such arrangement, all further "downstream" remote terminals are decoupled from the system even though such "downstream" remote terminals are otherwise operational.

As is also known in the art, each remote terminal is adapted to detect major and minor alarm conditions. These conditions are conditions which would not normally require removal of the terminal from the communication system, however, would be alarms to indicate to a person at the central office that a condition exists at the remote terminal in need of repair. With one technique, the remote terminal distorts the informational data transmitted by such terminal to the main terminal or central office. The distortion of such data, however, is undesirable since the quality of the system is, in effect, degraded.

SUMMARY OF THE INVENTION

In accordance with the present invention, a digital carrier system is provided having: a master terminal, and a plurality of serially coupled remote terminals, the master terminal transmitting information serially through the remote terminals and then back to the master terminal along a serial information loop, each one of such remote terminals comprising: (i) means, located in said remote terminal, for determining if any one of the plurality of predetermined service threatening conditions exist in said remote terminal; and, (ii) switch means for either diverting information in the loop to the remote terminal and then back to the loop or for preventing such diversion of information from the loop to the remote terminal selectively in accordance with the existence of a detected service threatening condition, the diversion or prevention of diversion of information through any one of the other remote terminals being independent of the operation of the switch means in said one of the remote terminals.

In accordance with an additional feature of the invention, the digital carrier system is adapted to transmit time multiplexed information. Each one of the remote terminals includes at least one processing unit. The format of such time multiplexed information comprises a sequence of sets of frames, each frame comprising a plurality of time slots, each time slot providing information for a corresponding processing unit. Each time slot is comprised of a series of bits of information. One bit of such information in a portion of the time slots of one of the frames in each set of frames is a signaling bit. Each one of the terminals includes means for detecting predetermined alarm conditions therein and an indication of such detected condition is transmitted to the master terminal by information in the signaling bit. With such arrangement, since in a T1 digital communication system there are typically two frames in each one of the sets of frames located for signaling bits and only one of such two frames (typically call status) is normally used, the use of the second frame for alarm status signaling results in a system with low information distortion.

In a preferred embodiment of the invention, a first means, located in the remote terminal, transmits a pair of alarm signaling bits in a pair of successive time slots associated with such remote terminal, the signaling bits representing the alarm status of such remote terminal; and a receiving means, located in the master terminal, receives and displays the pair of transmitted alarm signaling bits from the remote terminal and generates a summary of the alarm status in the remote terminal. In this manner, each of the plurality of remote terminals determines if any of the predetermined alarm conditions exist (e.g., overtemperature, low voltage, etc.) in the remote terminal and generates a pair of bits indicative of such conditions; one bit for a predesignated "major" alarm and the other bit for a predesignated "minor" alarm. In the master terminal, these corresponding pairs of bits are received and displayed so that repair personnel can determine the alarm status of each remote terminal.

BRIEF DESCRIPTION OF THE DRAWINGS

The foregoing features of this invention, as well as the invention itself, may be more fully understood from the following detailed description of the drawings, in which.

DESCRIPTION OF THE PREFERRED EMBODIMENT

Figure 1:
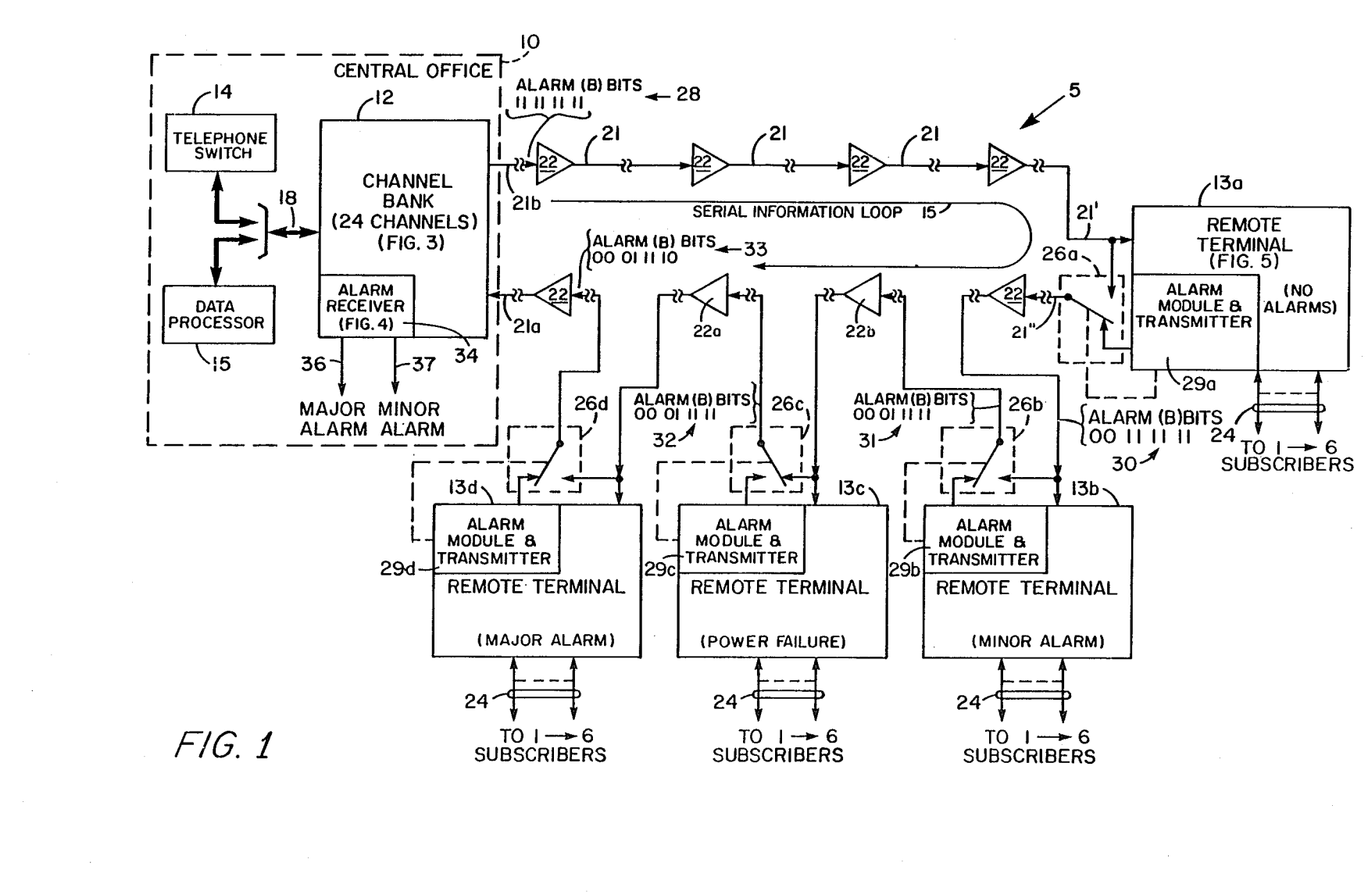
FIG. 1 is a diagram of a digital carrier communication system using a master terminal and four remote terminals with alarm bit patterns shown for various service threatening conditions existing in the remote terminals.

Referring to FIG. 1, a digital carrier communication system 5 is shown to include a central office (or master terminal) 10 wherein mixed voice and data communicated by telephone switch 14 and data processing 15, respectively, are conveyed via bus 18 and through a channel bank 12 for transportation to, or from, a plurality of, here four, serially coupled remote terminals 13a–13d. As will be described in detail hereinafter, each one of the remote terminals 13a–13d includes here six voice or data (voice/data or V/D) processing units for a total of, here 24, remote voice/data units. The central office 10 itself includes 24 voice/data units. The channel bank 12, here a conventional 24 channel pulse code modulation (PCM) system uses a T1 format, and multiplexes together voice and data information from switch 14 and data processor 15 while demultiplexing received voice and data information for telephone switch 14 and data processor 15. This T1 format will be discussed in detail in connection with FIGS. 2A–2C. Suffice it to state here that the T1 format includes a series or sequence of sets of frames (called superframes FIG. 2A), each one of such sets thereof being made up of 12 frames. Each frame has 24 time slots (one for each channel or remote voice/data unit) plus a framing bit. Each time slot is a serial eight bit digital word. The eight bits are used for voice/data information except for the sixth and twelfth frames wherein the eighth bits are here used for "signaling" information. More particularly, the eighth bits in the sixth frame are used for "A" signaling (i.e. call status) as in conventional T1 systems. Here, however, the eighth bits of the previously unused twelfth frame are used for "B" signaling (i.e. signaling the alarm status of the remote terminals 13a–13d in a manner to be described in detail hereinafter). Thus, the T1 format is a serial bit stream having 24 channels (or time slots), one for each one of the 24 remote voice/data units. The T1 bit stream is transmitted from the channel bank 12 carrying voice and data from telephone switch 14 or data processor 15 through cable pair 21b to a serial information loop 15 made up of the plurality of, here four, remote terminals 13a–13d serially coupled to the channel bank 12 through interspersed repeaters 22, as shown. Each one of the terminals 13a–13d is identical in construction and the details of an exemplary one thereof, here terminal 13a will be discussed later in connection with FIG. 5. Suffice it to say here, however, that the remote terminals 13a–13d are typically widely spaced from one another and from the central office 10. Each remote terminal 13a–13d multiplexes and demultiplexes up to six channels (one per voice/data unit thereof) from the T1 bit stream coupled to it from either: (1) the channel bank via cable pair 21b; or (2) from remote terminals of subscribers via buses 24. Thus, T1 bit stream is applied to a first remote terminal 13a where six predetermined channels, or time slots, of the twenty four time slots are demultiplexed from the T1 bit stream (one for each one of the 6 voice/data units therein) and supplied to subscribers via bus 24. Data from subscribers passes back through bus 24 to terminal 13a to be multiplexed for transmission in those six time slots demultiplexed by terminal 13a. The remaining eighteen time slots not so used are regenerated (repeated) and transmitted unmodified for the remaining three remote terminals 13b–13d. The process continues until the T1 bit stream from the last remote terminal 13d is coupled back to channel bank 12 by cable pair 21a. In normal operation, by-pass relays 26a–26d are normally operated such that voice or data fed to a remote terminal passes serially to the remote terminals; however, if a predetermined service threatening condition (e.g., power failure or losing synchronization with the incoming T1 bit stream) should occur in any terminal 13a–13d, the corresponding by-pass relay 26a–26d is deactivated thereby causing the data fed to such terminal to by-pass such terminal thereby allowing the remainder of the digital carrier communication system 5 to remain operational. Thus, in FIG. 1, remote terminal 13c is depicted with a service threatening condition (here a power failure) and hence such terminal 13c is removed from the loop via switch 26c.

Remote terminals 13a–13d also detect alarm conditions (e.g., over or undervoltage, blown fuse, door ajar, etc.) which are categorized apriori as either a "major" alarm or a "minor" alarm. A summary is then made of the alarm conditions in an alarm module and transmitter 29a–29d in corresponding remote terminals 13a–13d. To determine if any of the alarm conditions (i.e. any major or minor alarms) exist in any one of the remote terminals 13a–13d, the T1 bit stream includes reserved bits, i.e., the B alarm signaling bits. These are shown as a stream of B alarm signaling bits 28 in FIG. 1. Actual implementation of the B alarm signaling bits will be described below. Suffice it to say here, however, that the stream of B alarm signaling bits 28 is made up of four pairs of bits, each pair of bits representing the major and minor alarms in corresponding terminals 13a-13d. These pairs of bits have the following values and meanings:

00 No alarms
01 MINOR alarm
10 MAJOR alarm
11 Both MAJOR and MINOR alarms or a remote terminal 13a-13d being by-passed In order to account for the possibility that a remote terminal may, upon detection of service threatening condition, remove itself from the loop (via by-pass switches 26a-26d), the stream of B alarm signaling bits 28 sent along with the voice or data traffic from channel bank 12 to the first remote terminal 13 have all of the four pairs of bits thereof set to the "1" state, that is, to an "alarm" state. If remote terminal 13a has neither a minor alarm or major alarm as shown in FIG. 1, the alarm module and transmitter 29a in such remote terminal 13a replaces the first pair of bits of the four pairs of bits in the stream of alarm bits 28 with "0"s as shown in the stream of alarm bits 30. The "0"s indicate that there are no alarms existing in the remote terminal 13a. The stream of alarm bits 30 then passes to remote terminal 13b which here is assumed to have a minor alarm thereby causing alarm module and transmitter 29b therein to replace a second pair of the four pairs of alarm bits; the first bit of that pair is made a "0" and the second bit remains as a "1" indicating a minor alarm in terminal 13b as shown in the stream of alarm bits 31. This new stream of alarm bits 31 from remote terminal 13b is coupled to remote terminal 13c, which here is assumed to have a power failure as described above. As noted above, the data fed to remote terminal 13c by the one of the repeaters 22b is not diverted to the terminal 13c for processing, but rather remains in the loop and passes directly to repeaters 22a. It is noted, therefore, that the third pair of the four pairs of alarm bits has had no substitution made therefore, and therefore both bits remain "1" as shown in the stream of alarm bits 32. This stream of alarm bits 32 is subsequently coupled to remote terminal 13d which here is assumed to have a major alarm. Thus, alarm module and transmitter 29d therein substitutes in a last pair of the four pairs of alarm bits, the first bit with a "1" and the last bit with a "0" thereby indicating a major alarm and no minor alarm as shown in the stream of alarm bits 33. These alarm bits 33 are presented back to channel bank 12 in the central office 10 for alarm receiver 34 to provide an external summary of the alarm status of the remote terminals 13a-13d. An indication of such summary is presented by signals on the major alarm line 36 and the minor alarm 37 for an operator who can then service the appropriate terminal. It should be noted, however, that the central office is here not able to determine whether remote terminal 13c has both a major and a minor alarm or whether such terminal 13c is in a service threatening condition.

Figure 2A:
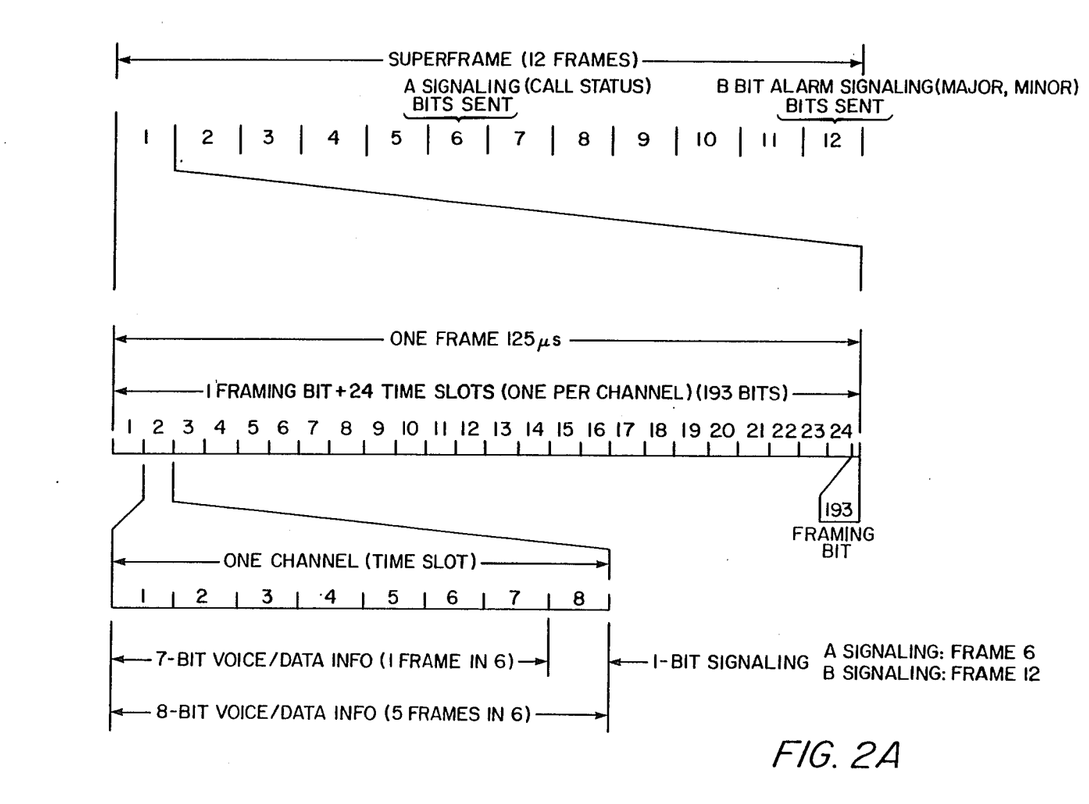
FIG. 2A diagrams the T1 bit stream format.
Figure 2B:
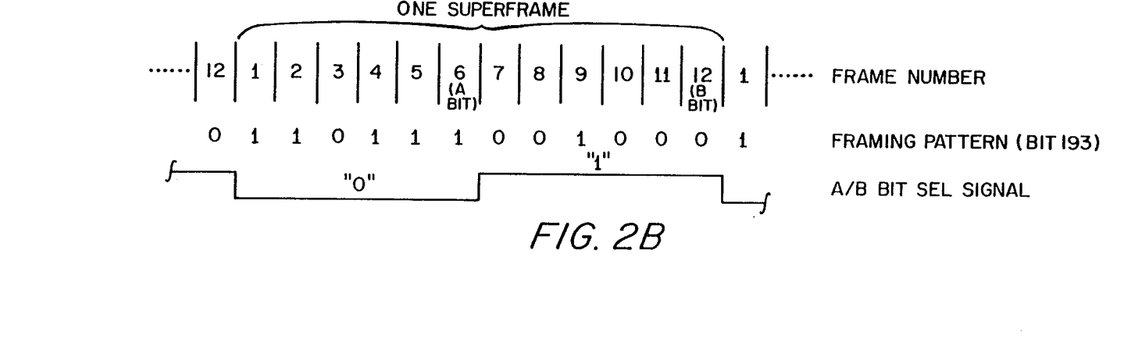
FIG. 2B diagrams the framing pattern and a control signal during a superframe.

Referring to FIG. 2A, a typical T1 bit stream is shown to include the superframe made up of twelve sequential time frames. "A" or "B" signaling information is sent in the sixth and twelfth frame of each superframe. In frame six, "A" signaling bits, typically used to indicate the status of a call (on-dash hook, off-dash hook, dialing, ringing, etc.), are sent, while in the twelfth frame, the "B" alarm signaling bits are sent. Each frame is here 125 microseconds long, having 24 channels or eight serial bit time slots (one time slot for each remote voice/data unit) and an extra bit, or the 193rd bit, called a framing bit. Each time slot (or channel) includes a series of eight bits; all eight bits are used for voice/data information except for the time slots in the sixth and twelfth frames as described above. Here during the twelfth frame, the eighth bit is used for B alarm signaling and, more particularly, the eighth bit of time slots 17-24 are used for the four pairs of alarm bit bits described above. FIG. 2B also shows the framing pattern for bit 193 for each frame of the superframe. This pattern of framing bit is generated in a manner to be described hereinafter in connection with FIG. 7 and is used to synchronize the T1 bit stream receivers and to indicate which frame is being transmitted.

Figure 2C:
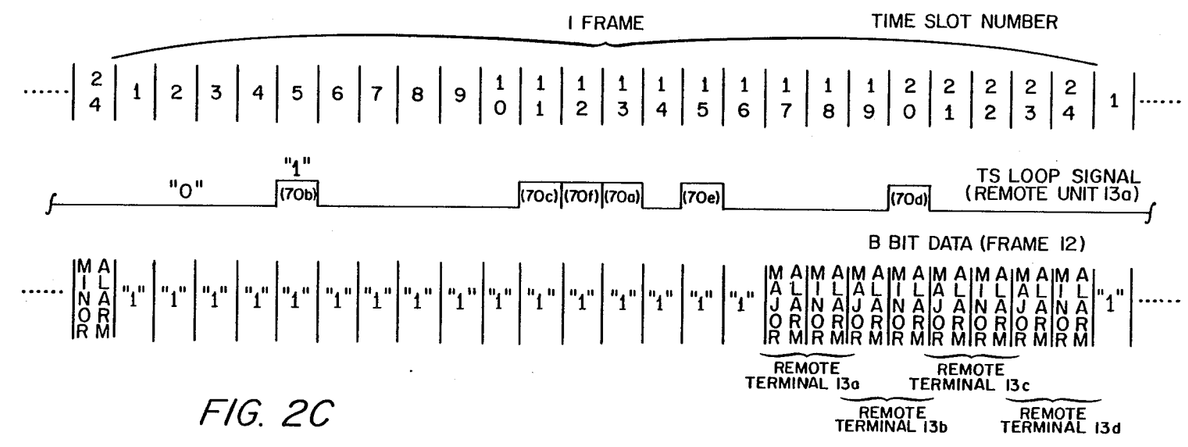
FIG. 2C diagrams alarm data bit assignment with respect to time slots in a frame, and a representative control signal for a representitive remote terminal as diagrammed in FIG. 5.

Referring back to FIG. 2A, as noted above each channel or time slot (TS) is made up of eight bits except during the sixth and twelfth frame where only seven bits are used to transmit voice or data and the eighth bit contains either an A signaling bit or a B alarm signaling bit depending upon which frame is being transmitted. That is, during frame six and frame twelve, all channels have the eighth bit carrying signaling information, call status or alarm status, while during all other frames, all eight bits in each channel carry voice and data information. Note that only during frame six are A alarm signaling bits being transmitted, and only during frame twelve are B alarm signaling bits being transmitted during the eighth bit, and all B bits leaving the channel bank 12 (FIG. 1) are set to "1" as described above in connection with FIG. 1. Once the T1 bit stream returns to the central office bank channel 12, the B alarm signaling bits, which were all "1"s leaving the channel bank, contain the alarm information for each of the remote terminals 13a-13d (FIG. 1) as shown in FIG. 2C. As shown, the B alarm signaling bits and the time slots 1-16 are not used and hence are here set to "1"s. However, the eighth, B alarm signaling bits of channels 17 and 18 form the first pair of alarm bits and contain major and minor alarm status, respectively, from remote terminal 13a (FIG. 1). Likewise, the eighth bits of channels 19 and 20 form the second pair of the B alarm signaling bits for the remote terminal 13b (FIG. 1); the eighth bits of channels 21 and 22 form the third pair of B alarm signaling bits for the remote terminal 13c (FIG. 1); and, the eighth bits of channels 23 and 24 form the fourth pair of B alarm signaling bits for remote terminal 13d (FIG. 1).

Figure 3:
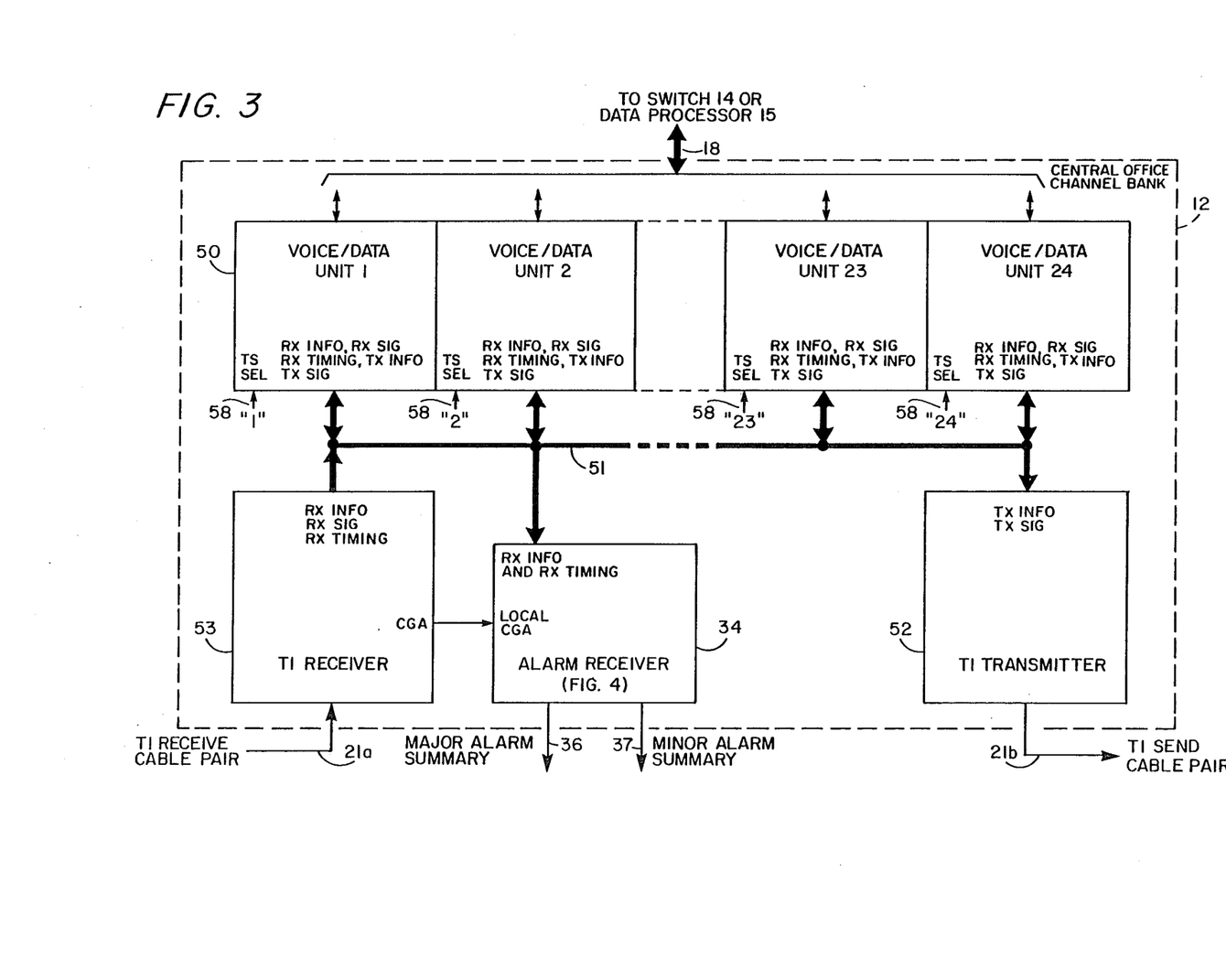
FIG. 3 is a block diagram of the master terminal located in the central office of FIG. 1 showing an alarm receiver.

Referring to FIG. 3, the central office channel bank 12 is shown in detail. Such channel bank is of conventional design; however, here the bank 12 is provided with an alarm receiver 34 and will be described in detail hereinafter in connection with FIG. 4. Suffice it to say here, however, that voice from telephone switch 14, or data from data processor 15 (FIG. 1) is coupled to voice/data 24 units collectively designated by numeral 50 via bus 18. The central office channel bank 12 includes 24 voice/data units, here designated "unit 1" through "unit 24". As noted above, the system 5 (FIG. 1) includes 24 voice/data units dispersed among the four remote terminals 13a-13d. Here, as noted briefly above, each one of the remote terminals 13a-13d includes here six voice/data units to be described in detail in connection with FIG. 5. Thus, referring to FIG. 3, each one of the voice/data units 1 through 24 (collectively referred to by numeral 50) communicates with a corresponding one of the 24 voice/data units included in the remote terminals 13a-13d. (For example, and for purposes of illustration, voice/data unit 1 may, for example, communicate with one of the six voice/data units in remote terminal 13c). Each one of the voice/data units 50 is adapted to receive incoming information from bus 18 for digital transmission to its corresponding voice/data unit in one of the remote terminals 13a–13d, and multiplexes such information into the predetermined time slot corresponding to the voice/data unit in such remote terminal for transmission by T1 transmitter 52 via cable pair 21b.

Referring again to FIG. 2A, it is again noted that each frame includes 24 time slots or channels, one time slot or channel for each one of the 24 voice/data units dispersed among the four remote terminals 13a–13d. For purposes of discussion, it will here assumed that the 24 voice/data units 50 in central office bank 12 will be selected sequentially and thus will be transmitted via T1 transmitter in time slots 1 through 24. It should be understood, however, that the sequencing may be in any desired order, said order being designated by the enable signals on lines 58 to the TS SEL terminals of the voice/data units 1–24 collectively designated by numeral 50. The voice/data units 50 also demultiplexes from the predetermined time slots digital information received by T1 receiver 53 for presentation back to the telephone switch 14 on data processor 15. Thus, each voice/data unit within the central office channel bank communicates with its corresponding voice/data unit in one of the remote terminals to enable a subscriber to correspond with data processor 15 or telephone switch 14 in the central office. The T1 receiver 53 is coupled to T1 receive cable pair 21a and receives an incoming T1 bit stream providing received information bit stream (RX INFO) (i.e., the internally generated, serial, eight bit word for each time slot including signaling); timing (RX TIMING) generated from the characteristics of the T1 serial bit stream and T1 receive cable pair 21a; and signaling (RX SIG) extracted from the eighth bit of each time slot in the sixth frame for presentation to voice/data units 50. The T1 transmitter 52 transmits information (TX INFO) (i.e., the serial eight bits of each time slot including the eighth bit signaling (TX SIG), (A bits only) generated by the voice/data units 50 and forces all B bits, including the four pairs of B alarm signaling bits 28 (FIG. 1), to "1" for transmission over T1 send cable pair 21b. Alarm receiver 34 (to be described in detail in connection with FIG. 4) also accepts receive information (RX INFO) and timing (RX TIMING) from bus 51 to decode the B alarm signaling bits generated by the remote terminals 13a–13d (or from the central office for a remote terminal which has been by-passed) to provide major alarm and minor alarm summary signals on lines 36 and 37, respectively. A local alarm for the T1 receiver 53 (i.e., common group alarm) (CGA) becomes active when the T1 receiver loses synchronization with incoming T1 bit stream on T1 receive cable pair 21a. This alarm is sent to the alarm receiver 34 for indication that a major alarm has occured in the channel bank 12.

Figure 4:
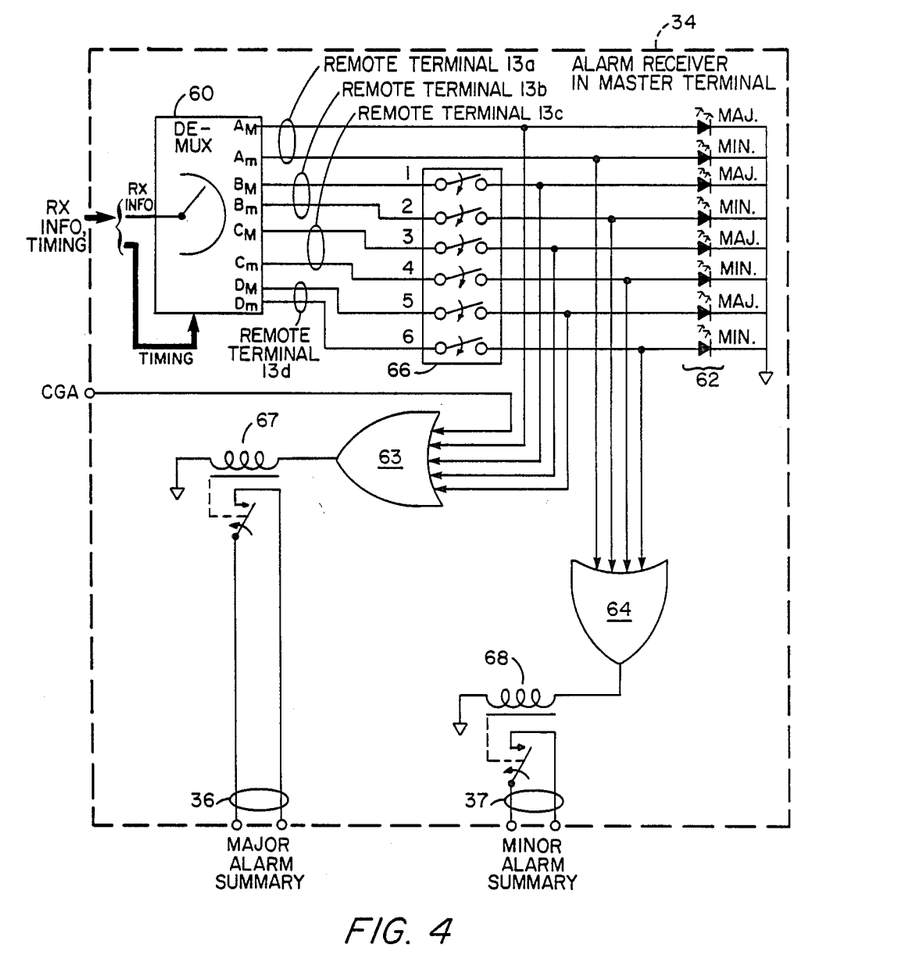
FIG. 4 diagrams the alarm receiver as shown in FIG. 3.

Referring to FIG. 4, a detailed diagram of the alarm receiver 34 is shown. Received information (RX INFO) from T1 receiver 53 (FIG. 3) is fed via bus 51 to demultiplexer 60 for decoding received B alarm signaling bits from RX INFO. The RX TIMING signals on bus 51 synchronize the demultiplexer 60 to receive the B alarm signaling bits from the time slots 17 to 24 during the twelfth frame (FIG. 2A) as described above. This alarm bit data from remote terminals 13a–13d (FIG. 1) is stored in demultiplexer 60. Demultiplexer 60 has four pairs of outputs: $A_M$, $A_m$; $B_M$, $B_m$; $C_M$, $C_m$; and, $D_M$, $D_m$, as shown. In response to the B alarm signaling bits fed to the demultiplexer 60, signals are produced on these four pairs of terminals indicating the presence or absence of major and minor alarms in the remote terminals 13a–13d. More specifically, the terminals $A_M$ and $A_m$ indicate the presence of major and minor alarms, respectively, from remote terminal 13a. Signals on terminals $B_M$ and $B_m$ indicate major and minor alarms, respectively, from terminal 13b. Signals on terminals $C_M$ and $C_m$ indicate major and minor alarms, respectively, from remote terminal 13c. Likewise, signals on terminals $D_M$ and $D_m$ indicate major and minor alarms, respectively, from remote terminals 13d. The signals on terminals $A_M$ through $D_m$ are fed to light emitting diodes 62 as indicated. It should be noted that coupled between terminals $B_M$ and $D_m$ and the light emitting diodes 62 is a switch bank 66. Such switch bank 66 includes six switches, as indicated, serially coupled between one of the terminals $B_M$ through $D_m$ and the corresponding light emitting diodes. This switch bank 66 is provided to enable system 5 (FIG. 1) to accommodate less than four remote terminals. That is, switches in bank 66 are used to selectively disable major and minor alarm information stored in multiplexer 60 when they are to be ignored as when less than four remote terminals 13a–13d are used. In such case, the two switches corresponding to the major and minor alarms associated with the unused remote terminals 13b–13d would remain in the open position, so that erroneous major and minor alarms would not be detected. An OR gate 63 is used to drive relay 67 to provide a summary of major alarm conditions of the digital communication carrier system 5 (FIG. 1) via line 36. An OR gate 64 drives relay 68 to provide a summary of the minor alarms in system 5 on line 37. The local CGA signal from T1 receiver 53 (FIG. 3) enters ALARM RECEIVER 34 and couples such signal to OR gate 63 so that a major alarm is generated if T1 receiver 53 loses synchronization with the incoming T1 bit stream on T1 receive cable pair 21a (FIG. 3).

Figure 5:
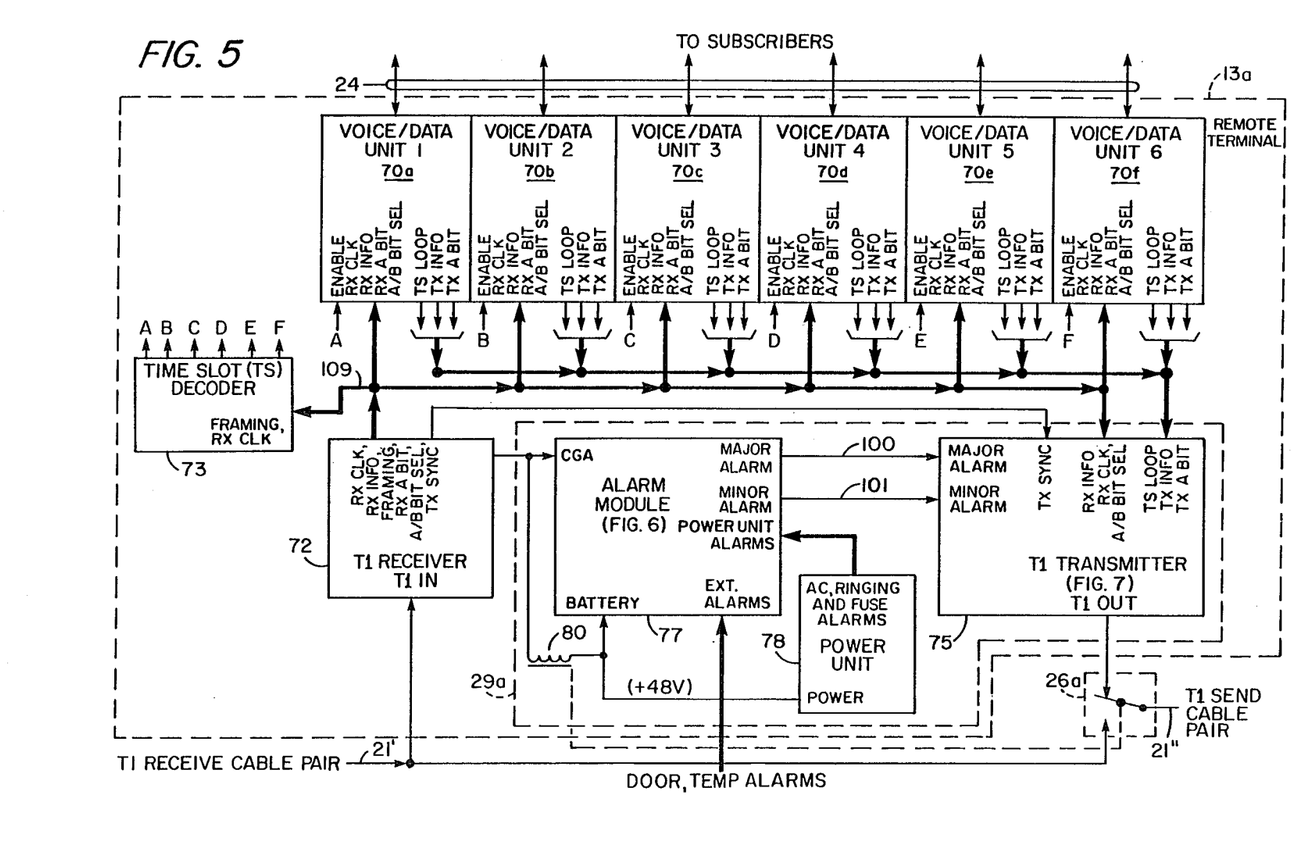
FIG. 5 diagrams a representative remote terminal showing alarm module a T1 transmitter and a cut-through relay for bypassing the remote terminal.

Referring to FIG. 5, an exemplary one of the remote terminals 13a–13d, remote terminal 13a, is shown. As indicated, such remote terminal 13a includes six voice/data units 70a–70f for interfacing with up to six subscribers through buses 24. Each voice/data remote unit 70a–70f demultiplexes information for a subscriber from T1 bit stream data received by a conventional T1 receiver 72 from T1 receive cable pair 21' and multiplexes information from a subscriber for transmission by T1 transmitter 75 through T1 send cable pair 21" when enabled to do so by time slot decoder 73. As indicated above, each one of the six voice/data units 70a–70f has a corresponding voice/data unit in the central office and, more particularly, in the central office channel bank 12 (FIG. 3). Time slot decoder 73 designates which time slot corresponds to each voice/data unit 70a–70f in remote terminal 13a. This correspondence is predetermined and stored in time slot decoder 73. When time slot decoder 73 determines that a time slot is occurring which corresponds to the particular one of the conventional voice/data units 70a–70f, that particular one of the units 70a–70f is enabled by the ENABLE input to that voice/data unit supplied by time slot decoder 73 as indicated. Additionally, a time slot loop (TS LOOP) signal is generated by the voice/data units 70a–70f in response to time slot decoder 73 which informs the T1 transmitter 75 that information in the active voice/data unit 70a–70f is to be transmitted in the instant time slot.

Referring back to FIG. 2C, a representative example of the time slot loop (TS LOOP) signal is shown. Here the TS LOOP signal indicates to T1 transmitter 75 that voice/data units 70a–70f in remote terminal 13a (FIG. 5) corresponds to time slots 13, 5, 11, 20, 15 and 12, respectively. During these six time slots, transmitter T1 will transmit information and signaling from the corresponding voice/data units 70a–70f. It is noted that such signaling information from such voice/ data units will be A bit signaling data only. B bit signaling data will be provided by T1 transmitter 75 from information fed thereto by the alarm module 77 in a manner to be described shortly. If, during a given time slot, there is no TS LOOP signal (i.e., no corresponding voice/data unit 70a–70f), then T1 transmitter 75 retransmits information received by T1 receiver 72. Therefore, only those channels which are designated for use by this remote terminal 13a (i.e., the channels corresponding to time slots 5, 11, 12, 13, 15 and 20) are used and all other time slots are passed through the remote terminal 13a unchanged.

Alarm module 77 in the alarm module and transmitter 29a encodes predetermined alarms into major or minor alarms for presentation to remote T1 transmitter 75 via lines 100 and 101. Examples of potential major and minor alarms are: (1) Power unit alarms such as battery under and overvoltage, ringing voltage failure, AC power failure, and blown fuse; (2) external alarm inputs such as door ajar and overtemperature; and, (3) a carrier group alarm (CGA) from T1 receiver 72 to indicate if T1 receiver 72 is out of synchronization. Whether these three alarms (i.e., service indicating conditions) are major alarms or categorized as minor alarms is up to the user and is so designated in a manner to be described in connection with FIG. 6, more particularly, through switches 103, 104 shown in FIG. 6 in a manner to be described.

Figure 6:
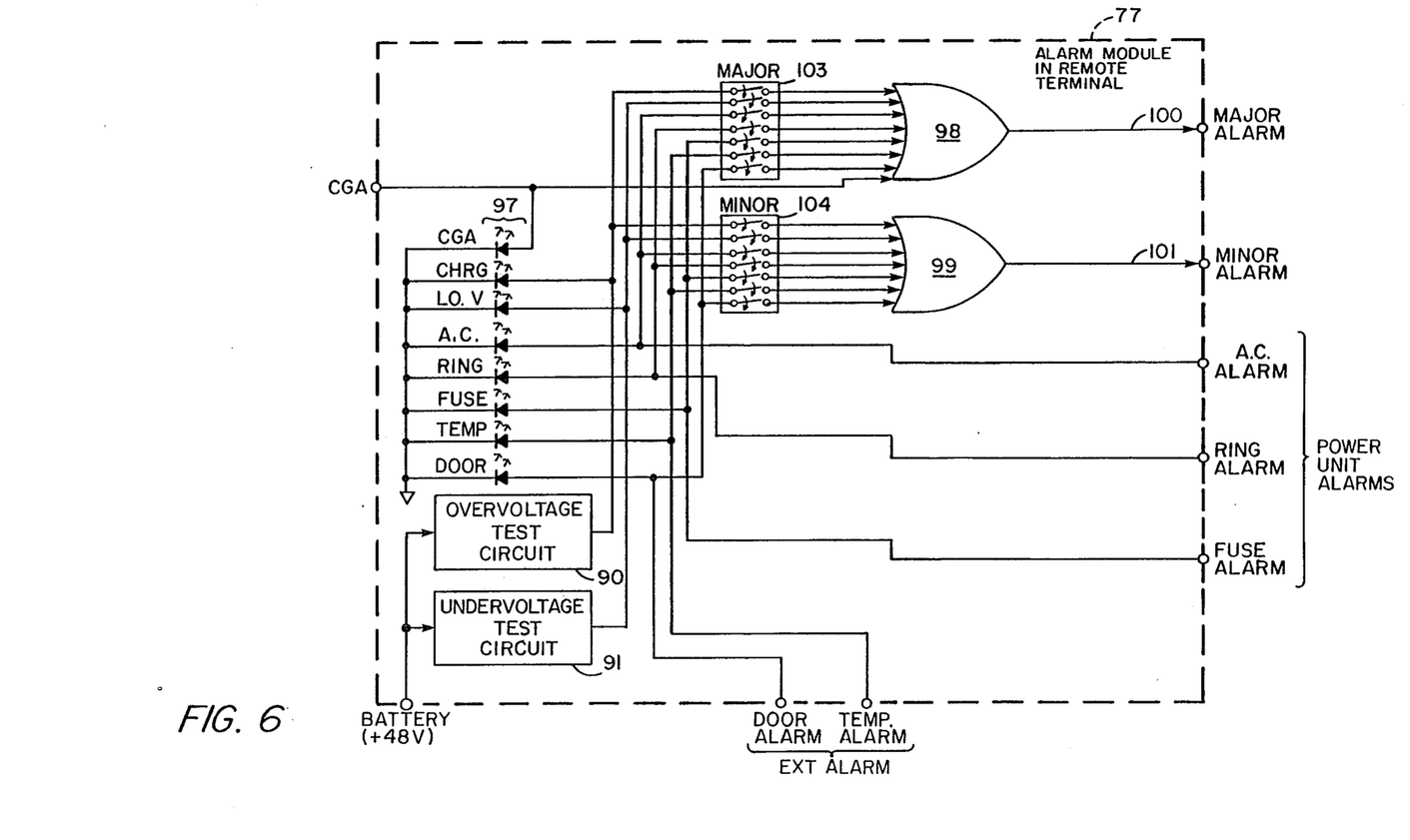
FIG. 6 diagrams the alarm module shown in FIG. 5.

Referring to FIG. 6, the alarm module 77 (FIG. 5) is shown. Battery voltages are fed to an overvoltage test circuit 90 to determine if the battery voltage is too high, thereby indicating a battery charger failure alarm. Battery voltage is also fed to an undervoltage test circuit 91 to determine if the battery voltage is too low, thereby indicating a low voltage alarm. Power unit alarms are AC power alarm (A.C. ALARM), ringing voltage alarm (RING ALARM), and blown fuse alarm (FUSE ALARM). External alarms are door ajar, (DOOR ALARM) and temperature alarm (TEMP ALARM). These external alarms drive, along with power unit alarms indicated, and undervoltage test circuitry, corresponding light emitting diodes (DOOR, TEMP., A.C., RING, FUSE, CHRG AND LO V., respectively) in light emitting diode array 97. These alarm signals are fed to OR gates 98 and 99 through major and minor switch banks 103, 104 as indicated. Those alarms which are categorized as major alarms have the switches in switch bank 103 set in a closed position, and the remaining alarms categorized as minor alarms have the switches in minor switch bank 104 set in the closed position to form major and minor alarm signals on bus 100 and 101, respectively. A carrier group alarm (CGA) from T1 receiver 72 (FIG. 5) indicates a loss of synchronization by T1 receiver 72 with the incoming T1 bit stream on T1 receive cable pair 21' to drive a corresponding light emitting diode (CGA) in light emitting diode array 97 and here also generates a major alarm by enabling OR gate 98 to produce a major alarm signal on line 100.

Returning to FIG. 5, by-pass relay 26a is shown in the operated or nonby-passed state. Therefore, a T1 bit stream entering remote terminal 13a via T1 cable pair 21' is processed by the remote terminal 13a and is then retransmitted by transmitter 75 out to cable pair 21' via operated by-pass relay 26. Therefore, referring briefly also to FIG. 1, the by-pass relay 26 is operated so that data on the serial transmission loop is diverted into remote terminal 13a and data in remote terminal 13a is again passed to the central office via such data loop. By-pass relay 26a remains in the operated (normal) state as shown by solenoid 80 being active. More particularly, power unit 78 applies (typically +48 volts) to end 81 of solenoid 80 and the remaining end 83 is coupled to the carrier group alarm (CGA). With no CGA (CGA is "low") and power applied (a normal condition) to end 81, by-pass relay 26a remains activated. Should either: a CGA alarm exist (in which case end 83 goes "high"); or, power unit 78 fails, the solenoid 80 would be deactivated and by-pass relay 26 would become operated so that data in cable pair 21' by-passes remote terminal 13a (i.e., prevents diversion of data from the serial information loop 15 to the remote terminal) and passes directly (unmodified) to cable pair 21" without being diverted from the serial information loop 15.

Figure 7:
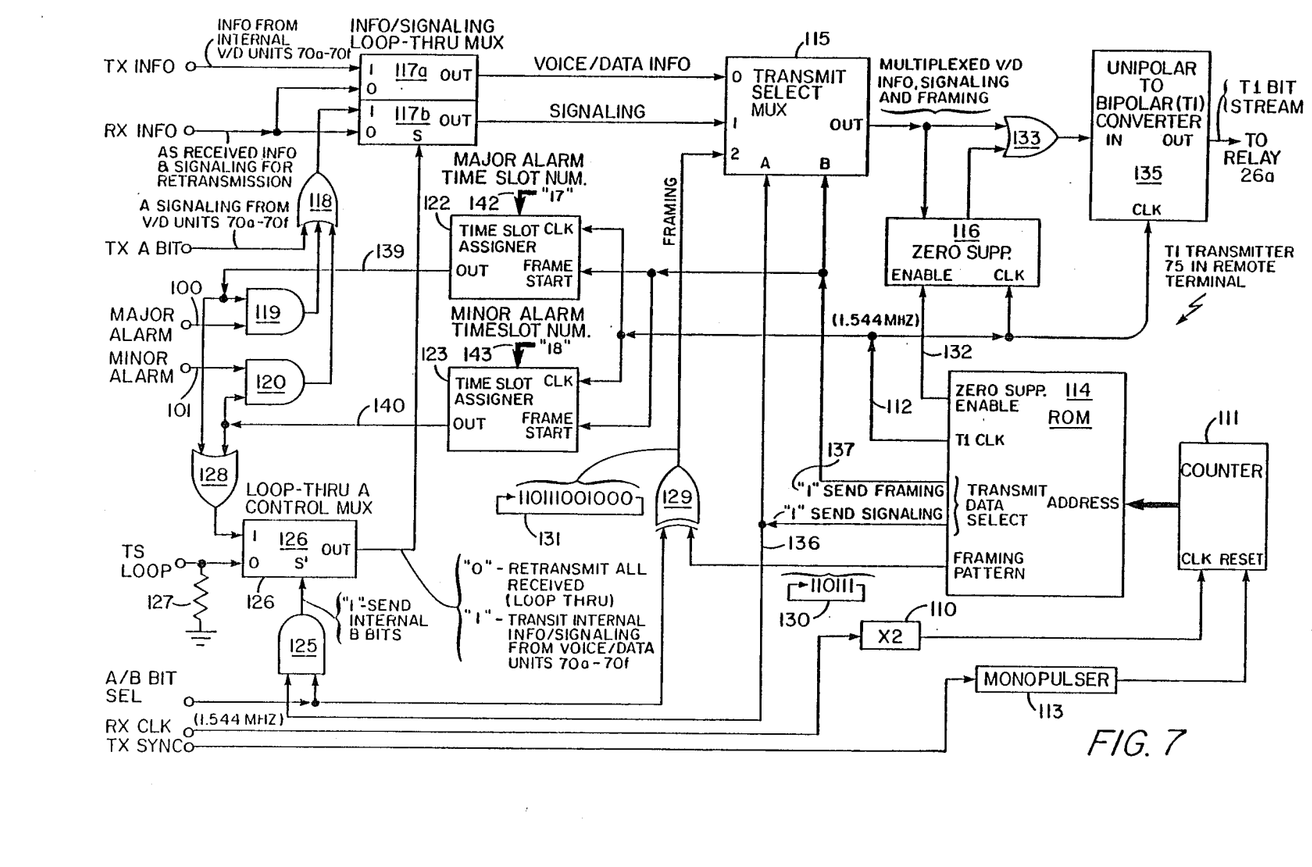
FIG. 7 diagrams the T1 transmitter in the representitive remote terminal as shown in FIG. 5.

Referring to FIG. 7, T1 transmitter 75 (FIG. 5) is shown in detail. A receive clock (RX CLK) having a frequency at the data rate (typically 1.544 MHz) and derived from incoming T1 bit stream fed thereby from T1 receiver 72 (FIG. 5), via bus 109 drives "times 2" frequency multiplier 110 which, in turn, drives counter 111. A transmit synchronization signal, TX SYNC, also derived from T1 receiver 72 (FIG. 5), drives monopulser 113 (i.e., one shot multivibrator) to initialize (RESET) counter 111 at the start and middle of each superframe (FIG. 2A) as received by T1 receiver 72. Counter 111 drives ROM 114 which controls operation of T1 transmitter 75. A timing clock (T1 CLK) 112, produced by ROM 114 and synchronized with RX CLK, provides basic timing for all functions in the T1 transmitter 75. A pair of output lines 136, 137 from ROM 114 (TRANSMIT DATA SELECT), drive transmit data select multiplexer 115 to select for transmission either: (a) voice/data information at port 0 (i.e., bits 1 through 8 or bits 1 through 7 for the sixth and twelfth frames (FIG. 2A)); (b) signaling at port 1 (i.e., bit eight in the sixth and twelfth frames); or (c) framing at port 2 (i.e., the 193rd bit in every frame). Thus, transmit multiplexer 115 time multiplexers voice/data information; signaling information; and framing information in response to signals on lines 136 and 137. An outgoing bit stream for multiplexer 115 passes through OR gate 133 to a conventional unipolar to bipolar converter 135 for conversion from unipolar information (a "0" to approximately 0 volts while a "1" is some predetermined voltage, typically about 5 volts) to T1 format bipolar information (consecutive "1"s are pulses of opposite polarity and "0"s are an absence of pulses). Zero suppressor 116, enabled by an enable signal on lead 132 from ROM 114 inserts "1"s into the outgoing bit stream from multiplexer 115 using OR gate 133 when more than seven consecutive zeros have been transmitted. This is necessary in order for the T1 receivers 72 in succeeding remote terminals to generate RX CLK signals and thereby maintain synchronization of downstream T1 receivers because such RX CLK signals can only be generated by "1" pulses. Data presented to transmit data select multiplexer 115 port 0 (voice/data information and "1" (signaling)) are controlled by information/signaling loop-through multiplexer 117a, 117b. Multiplexer 117a selects for transmission voice/data information from either: internal voice/data units 70a–70f (FIG. 5); or externally and received by T1 receiver 72 (FIG. 5). The internal voice/data information is fed to multiplexers 117a, 117b via TX DATA and the external voice/data information is fed thereto via RX DATA. Multiplexer 117b selects an internal "A" or "B" signaling source for transmission. "A" signaling from the internal voice/data units 70a–70f is fed to multiplexer 117b through OR gate 118 via TX A BIT. External A and B signaling is fed to multiplexers 117a, 117b via RX INFO. Internal B signaling bits are fed to multiplexer 117b to OR gate 118 via AND gates 119, 120. Both information/signaling loop-through multiplexers 117a, 117b are controlled by a signal on common select input S which is driven by loop-through control multiplexer 126. This multiplexer 126, having control line S', selects whether the signal on line TS LOOP or the signal from OR gate 128 will control multiplexers 117a, 117b. By way of example, if internal voice/data information or internal A bit signal (i.e., TX INFO or TX A BIT) is to be transmitted, the S' input of multiplexer 126 is "low", causing the TS LOOP signal to control the S input of multiplexers 117a, 117b. Resistor 127 keeps TS LOOP signal low (a "0") while none of the internal voice/data units 70a–70f are active (FIG. 5). Referring momentarily back to FIG. 2C, the TS LOOP is shown normally "0" and pulsing "high" during those time slots (time slots 5, 11–13, 15 and 20) when internal voice/data units 70a–70f (FIG. 5) are active. Therefore, with multiplexer 126 configured to pass TS LOOP signal to the TS input of multiplexers 117a, 117b when TS LOOP signal is a "0", port 0 is accessed and all external voice/data information and external "A" and "B" signaling is transmitted to multiplexer 115 for retransmission; however, if TS LOOP signal is a "1", then port 1 is accessed and internal voice/data information is passed from the voice/data units 70a–70f (FIG. 5) transmit data (TS DATA) and internally generated A signaling bits (TX A BIT) passes through OR gate 118 to multiplexer 115 for transmission. Alternatively, if port 1 of multiplexer 126 is selected (i.e., when internally generated B bit alarm signaling is to be transmitted) a "1" on port 1 of multiplexer 126 will cause internally generated alarm information (major, minor) for the alarm module 75 (FIG. 5), via lines 100, 101 to be transmitted via port 1 of multiplexer 117b. However, a "0" on port 1 of multiplexer 126 will cause externally generated B bits in the received T1 bit stream RX INFO to be passed by port 0 of multiplexer 117b for transmission. Port 1 of multiplexer 126 is driven by OR gate 128 which is active only during those corresponding time slots in which major and minor alarm data from remote terminal 13a are assigned (slots 17, 18) as determined by the time slot assigners 122, 123 described below. The signal for the select input S' of multiplexer 126 is generated by AND gate 125. Output of AND gate 125 is a "1" when A/B BIT SEL signal is a "1" and signaling is to be transmitted by multiplexer 115, as indicated when line 136 is a "1". Temporarily referring back to FIG. 2, the A/B BIT SEL signal is shown corresponding to the frame number sequence wherein during frames 7 through 12, A/B BIT SEL signal is a "1". It is also noted that "A" bit signaling occurs in the sixth frame (i.e., when A/B BIT SEL is a "0") and "B" signaling occurs in the twelfth frame (i.e., when A/B BIT SEL is a "1"). Referring back to FIG. 7, when port 1 of multiplexer 115 is accessed for signaling transmission, line 136 is a "1". Therefore, output of AND gate 125 is a "1" only during a B bit (frame twelve signaling internal (FIG. 2A) thereby causing multiplexer 126 to access port 1. OR gate 118 passes both A bit signaling (TX A BIT) from internal voice/data units 70a–70f (FIG. 5) or internal B bit (alarm information) signaling from a major alarm line 100 and minor alarm line 101 when the latter two are enabled through AND gates 119 and 120, respectively, by time slot assigners 122, 123. The time slot assigners 122, 123 indicate when T1 transmitter 75 is transmitted in a predetermined time slot by a "1" on lines 139, 140, here time slots 17 and 18 (FIG. 2C) for remote terminal 13a. These predetermined time slot numbers are loaded into inputs 142, 143 on time slot indicators 122, 123, respectively. As shown in FIG. 2C, these predetermined time slots are used to send major and minor alarm information in the internal B bits for here terminal 13a. For terminals 13b, 13c, and 13d, the time slots are: 19, 20; 21, 22; and 23, 24, respectively. In the preferred embodiment, these time slot assigners 122, 123 are of the type CD 14417 manufactured by Motorola Semiconductor Products, Inc. When time slot assigner 122 indicates that a predetermined time slot for major alarm transmission is occuring (here time slot 17) line 139 goes to "1" and AND gate 119 is enabled to convey major alarm status through OR gate 118 to multiplexer 117b for transmission. If time slot assigner 123 indicates that a predetermined time slot for minor alarm transmission is occuring, AND gate 120 is enabled at time slot 18 by a "1" on line 140 to convey minor alarm status to OR gate 118. When either time slot assigners 122, 123 indicate that a predetermined time slot is occuring, OR gate 128 is enabled so that multiplexer 117b is configured to access port 1 to transmit the major or minor alarm bit from OR gate 118. Note that major and minor alarm bits from remote unit 13a are transmitted only when A/B SEL signal is a "1", and signaling is to be transmitted by lead 136 being a "1" and either one of the time slot assigners 122, 123 indicates a predetermined time slot is occuring by leads 139, 140 being a "1". Time slot assigners 122, 123 are synchronized by a pulse into FRAME START input on each time slot assigner 122, 123. The FRAME START input is driven by a signal on line 137 from TRANSMIT DATA SELECT output from ROM 114. Line 137 is a "1" only when a framing bit (bit 193, FIG. 2A) is to be transmitted, i.e., multiplexer 115 is configured to access port 2. Time slot assigners 122, 123 count T1 clock pulses on line 112 to determine which time slot is occuring.

The framing pattern 134 from exclusive OR gate 129 is a unique bit pattern used by the T1 receiver 72 to determine when the sixth and twelfth frame is occuring. The framing bit pattern 131 is generated by exclusive OR gate 129 taking shortened framing pattern 130 from ROM 114 and inverting it when A/B BIT signal is a "1", thereby forming correct framing pattern 131. Referring back to FIG. 2B, during frames 1 through 6, A/B bit signal is low, and during frames 7 through 12, A/B bit signal is high, and the framing pattern of bit 193 in frames 7 through 12 is the inverse of the framing pattern in frames 1 to 6. Therefore, the framing pattern stored in ROM 114 need only be six bits long as indicated by bit pattern 130. The subsequent inversion of the framing pattern from ROM 114 to exclusive OR gate 129 is shown in the bit pattern 131 which is sent to multiplexer 115 port 2 for transmission of the framing bit (bit 193).

Having described a preferred embodiment of this invention, it should now be apparent to one of skill in the art that other embodiments incorporating its concept may be used. It is felt, therefore, that this invention should not be restricted to the disclosed embodiment, but rather should be limited only by the spirit and scope of the appended claims.

What is claimed is:

1. A digital carrier system comprising:
   (a) master terminal means for transmitting and receiving time multiplexed information in a predetermined format, the format of the time multiplexed information being a sequence of sets of frames, each frame having a plurality of time slots, each time slot providing information for a corresponding processing unit and having a series of bits of information, one bit of such information in a portion of the plurality of time slots of one of the frames in each set of frames being a signaling bit, the value of each signaling bit having a first predetermined value when transmitted from the master terminal means;
   (b) at least one remote terminal means, coupled to the master terminal means, for receiving and transmitting the time multiplexed information;
   (c) means, disposed within the remote terminal means, for detecting at least one type of predetermined service indicating condition therein; and
   (d) transmitting means for sending an indication of such detected service indicating condition or absence of such service indicating condition to the master terminal means by setting the values of the signaling bits in specified ones of the time slots to indicate which of the at least one type of predetermined service indicating conditions is detected.

2. The digital carrier system as recited in claim 1 wherein the detecting means transmits the indication of such service indicating conditions as a pair of alarm signaling bits in the signaling bits in successive time slots corresponding to such remote terminal, and the system further comprises:
   receiving means, located in the master terminal means, for receiving and displaying the pair of alarm signaling bits from the remote terminal means and generating a summary of the service indicating conditions.

3. The digital carrier system recited in claim 2 wherein the remote terminal means further comprises:
   (a) alarm means for determining whether any one of a plurality of predetermined service threatening conditions exists in the remote terminal means; and
   (b) switch means for diverting time multiplexed information from the remote terminal means in accordance with the existence of selected ones of the plurality of service indicating conditions.

4. The digital carrier system recited in claim 3 wherein the master terminal means further comprises:
   signaling transmission means, for transmitting a plurality of pairs of transmitted signaling bits in the successive time slots used by said pair of alarm signaling bits, the pair of transmitted signaling bits received by the receiving means thus indicating the prevention of diversion of time multiplexed information to the remote terminal, and reception of the pair of alarm signaling bits by the receiving means thus indicating the diversion of time multiplexed information to the remote terminal.

5. A digital carrier communication system having a master terminal and a plurality of serially coupled remote terminals, said master terminal and remote terminals being adapted to transmit and receive time multiplexed information in a T1 digital bit stream format, such format including a plurality of signaling bits, such system comprising:
   (a) means, disposed in each one of the plurality of remote terminals, for detecting predetermined service indicating conditions in each one of the plurality of remote terminals; and
   (b) means for transmitting from each one of the plurality of remote terminals specified ones of the signaling bits with bit values representative of specific service indicating conditions and the one of the plurality of remote terminals in which each specific service indicating condition is detected.

6. A digital carrier system apparatus used for exchanging bits of information between a main terminal and a plurality of remote terminals, comprising:
   alarm signaling presetting means, disposed within the main terminal, for presetting a plurality of major alarm signaling bits and a like plurality of minor alarm signaling bits, at least one major alarm and minor alarm signaling bit for each of the plurality of remote terminals;
   first transmitting means, fed by the alarm signaling presetting means, for transmitting the major and minor alarm signaling bits to at least a certain one of the plurality of remote terminals;
   detection means, located in the certain remote terminal, for detecting major and minor alarm conditions;
   resetting means, fed by the first transmitting means and the detection means and located in the certain remote terminal, for resetting the major and minor alarm signaling bits respectively in accordance with the major and minor alarm conditions; and
   disabling means, coupled to the resetting means, for disabling the resetting means upon occurrence of a service threatening condition.

7. Apparatus as in claim 6, additionally comprising:
   a second transmitting means, fed by the resetting means, for transmitting the alarm signaling bits to the main terminal; and
   alarm determining means, disposed within the main terminal and fed by the plurality of second transmitting means, for determining if a major or minor alarm has occurred in any of the plurality of remote terminals.

8. Apparatus as in claim 6 where the digital carrier system exchanges bits of information in accordance with a T1 digital subscriber format using a time-multiplexed signal consisting of a repeating sequence of sets of frames, each frame having a plurality of time slots, each time slot having a sequence of bits of information, and the alarm signaling presetting means additionally is for presetting a plurality of major and minor signaling bits, predetermined to be successive certain ones of the sequence of bits in a preselected time slot in a preselected frame.

9. Apparatus as in claim 6 where the detection means additionally comprises:
   means for determining which elements of a group of alarm conditions consisting of battery undervoltage, battery overvoltage, alternating current power, ringing voltage blown fuse, door ajar and temperature are selected as major alarms.

10. Apparatus as in claim 6 where the detection means additionally comprises:

means for determining which elements of a group of alarm conditions consisting of battery undervoltage, battery overvoltage, alternating current power, ringing voltage blown fuse, door ajar and temperature are selected as minor alarms.

11. Apparatus as in claim 6 additionally comprising: a plurality of display means, located in each of the plurality of remote terminals and coupled to the corresponding detection means, for displaying major and minor alarm status for each of the remote terminals.

12. Apparatus as in claim 7 additionally comprising:

display means, located in the master terminal and coupled to the alarm determining means, for displaying major and minor alarm status for each of the plurality of remote terminals.

13. Apparatus as in claim 6 where the disabling means disables the resetting means upon occurrence of a power failure.

14. Apparatus as in claim 6 where the disabling means disables the resetting means upon occurrence of a carrier group alarm.

15. Apparatus as in claim 6 where the disabling means further comprises:

means for providing a carrier group alarm signal indicating proper synchronization between the remote and main terminals;

means for providing a power signal;

relay means, coupled to the remote terminal and the main terminal, for allowing the main terminal to selectively connect to or bypass the remote terminal in response to a control signal;

solenoid means, fed by the carrier alarm signal at one input and the power signal at another input, for providing the control signal, the control signal normally causing the relay means to connect the main terminal to the remote terminal, but the control signal causing the relay means to bypass the remote terminal when a voltage difference between the carrier group alarm signal and the power signal indicates failure of the carrier alarm signal means or the power signal means.

16. A digital carrier loop remote terminal for sending and receiving information in a bit stream to and from a master terminal, the bit stream in T1 format, the remote terminal comprising:

A. receiving means, fed by a received T1 format bit stream, for providing a received information bit stream, a received clock, a transmitter synchronization signal, and a call status/alarm select signal;

B. means for providing an information bit stream to be transmitted from the remote terminal to the master terminal;

C. means for providing call status bits;

D. means for providing a major alarm bit;

E. means for providng a minor alarm bit;

F. means for providing a time slot loop signal; and

G. transmitter means, fed by the receiving means, the bit stream to be transmitted, the call status bit, the major alarm bit, and the minor alarm bit, for providing a transmitted T1 format bit stream and further comprising:

i. counter means, fed by the received clock, for providing address signals;

ii. programmable memory means, fed by the address signals, for providing a framing pattern signal, a framing enable signal, and a signaling enable signal;

iii. major alarm time slot assigning means, fed by the framing enable signal, for generating a major alarm enable signal;

iv. minor alarm time slot assigning means, fed by the framing enable signal, for generating a minor alarm enable signal;

v. first multiplexing means, fed by the bit stream to be transmitted and the received T1 format bit stream, for providing a multiplexed bit stream equivalent to the bit stream to be transmitted when the time slot loop signal is true, and otherwise equivalent to the received T1 format bit stream;

vi. second multiplexing means, fed by the call status/alarm select signal, the call status bits, the major and minor alarms bits, the major and minor alarm enable signals, and the received T1 format bit stream, for providing a multiplexed signaling bit equivalent to the call status bit when the call status/alarm enable signal indicates call status, equivalent to the major alarm bit when the major alarm enable is true and the call status/alarm select indicates alarm, equivalent to the minor alarm bit when the minor alarm enable is true and the call status/alarm select indicates alarm, and otherwise equivalent to the received T1 format bit stream;

vii. transmit select multiplexing means, fed by the framing enable signal, the signaling enable signal, the framing signal, the multiplexed bit stream and the multiplexed signaling bit, for providing the transmitted T1 format bit stream signal equivalent to the framing signal when the framing enable signal is true, equivalent to the multiplexed signaling bit when the signaling enable signal is true, and equivalent otherwise to the multiplexed bit stream.

17. In a digital carrier communication system of the type wherein a master terminal communicates using a time multiplexed bit stream in T1 format with each one of a plurality of remote terminals arranged in a loop, each remote terminal also having means for disconnecting itself from the loop upon occurrence of a predetermined service threatening condition in the remote terminal, the improvement in each remote terminal comprising:

(a) means for periodically setting a certain predetermined bit in the bit stream to indicate to the master terminal that a service threatening condition exists at that remote terminal; and (b) means for periodically setting other predetermined bits in the bit stream in accordance with major and minor alarm conditions to indicate to the master terminal the type of alarm conditions extant in each remote terminal.

* * * * *